May 15, 1951 W. J. O'BRIEN 2,552,809

COMPENSATED AMPLIFIER CIRCUIT

Filed Aug. 27, 1945

INVENTOR.
WILLIAM J. O'BRIEN
BY
Harold W. Mattingly
Attorney

Patented May 15, 1951 2,552,809

UNITED STATES PATENT OFFICE 2,552,809

COMPENSATED AMPLIFIER CIRCUIT

William J. O'Brien, London, England, assignor to The Decca Record Company, Limited, London, England, a corporation of Great Britain Application August 27, 1945, Serial No. 612,989

1 Claim. (Cl. 179—171)

My invention relates to thermionic amplifiers and has particular reference to an alternating voltage amplifier circuit including means for preventing changes in the internal capacities of a thermionic tube from affecting the phase relation between the input and output voltages of the amplifier.

In certain thermionic alternating voltage amplifier applications it is desirable or necessary to maintain a fixed phase relation between the input and output potentials of the amplifiers, and it is also often necessary to vary the grid bias on the thermionic tubes of such amplifiers for the purpose of varying the amplification thereof. When the grid bias is so altered the mutual conductance of the tube is changed correspondingly, and a change in the space charge results. These changes serve to shift the input capacity of the tube between the control grid and the cathode.

In my copending application Serial No. 405,496, filed August 5, 1941, Patent No. 2,404,809 issued July 30, 1946, and titled "Compensating Circuit," I have disclosed a means for compensating the input capacity of an amplifier tube to maintain a constant phase relationship regardless of changes in the mutual conductance of the tube resulting from variations in the operating bias. This was accomplished by using an un-by-passed cathode resistance which was included in the input circuit, and which operated to reduce the control grid to cathode capacity by an amount proportional to the change in the mutual conductance of the tube, and also by an amount substantially equal to the increase over the cold capacity caused by the space charge within the tube. By a proper selection of the value of resistance used it is possible to make the input capacity substantially independent of the bias applied to the control grid for gain control purposes.

In a thermionic tube there also exists an internal capacity between the plate and the cathode. With the neutralising resistor arrangement just described, this capacity reflects on the input circuit because the cathode resistance is common to both the input and output circuits of the tube. Accordingly, prior to the present invention, it was necessary to employ additional neutralising circuits for minimizing the effect on the input circuit of the plate to cathode capacity. Neutralising was also required to minimize the phase shifts in the output circuits produced by changes in the plate to cathode capacity. The use of such neutralising devices increases the complexity of the circuit and creates one more adjustment which must be made in the adjustment and operation of the amplifier. Also, undesired phase shifts may be introduced due to changes in the neutralising capacities resulting from changes in temperature, pressure or humidity.

In conventional amplifier circuits where the cathode is connected to ground or where the cathode dropping resistor is by-passed by an adequately large condenser, the effect of the plate to cathode capacity can be rendered negligible by the use of a pentode or triple grid type of vacuum tube. In such circuits it is common practice to connect the suppressor grid to the cathode. The suppressor grid serves to shield the plate from the cathode, and while it introduces a relatively large plate to suppressor grid capacity, this capacity is constant and is not subject to change as a result of change grid bias. Further shielding is accomplished in certain types of tubes by the use of internal anode shields which are often times connected internally to the cathode of the tube.

Intended stabilization effects of the plate shields and suppressor grid are not realised when the input circuit is neutralised by an un-by-passed cathode resistance as in the circuit described in my aforementioned copending application. This is for the reason that the connection of the shield and suppressor grid to the cathode adds a large plate to cathode capacity in the output circuit at a point which is common also to the input circuit so as to apply from the plate a signal voltage with respect to ground upon the cathode. This voltage bears a phase quadrature relation to the plate to ground, and grid to ground signal voltages. As a result, the phase of both the input and output signals is caused to shift with a change in operating the bias.

Fortunately, there are available a few commercial vacuum tubes of the pentode type in which the suppressor grid and/or internal plate shield are brought out to external connections to allow them to be connected as desired. The present invention makes use of tubes of this character, and is directed to neutralising the input and output capacities of the tube to prevent phase shifts resulting from changes in grid bias.

It is, therefore, an object of my invention to provide a thermionic amplifier circuit which includes a novel means for eliminating the plate to cathode capacity normally found in the thermionic amplifier tubes.

It is also an object of my invention to provide a thermionic amplifier circuit employing five element tubes of the pentode type, and in which the need for conventional plate to cathode neutralising circuits is obviated by a novel circuit arrangement.

It is a still further object of my invention to provide a circuit of the character set out in the preceding paragraph, in which the input capacity is neutralised by means of an un-by-passed cathode resistance, and in which the plate to cathode capacity is neutralised by connecting the suppressor grid and/or internal plate shield to ground.

Other objects and advantages of my invention will be apparent by a study of the following specifications read in connection with the accompanying drawings, wherein.

Figure 1:
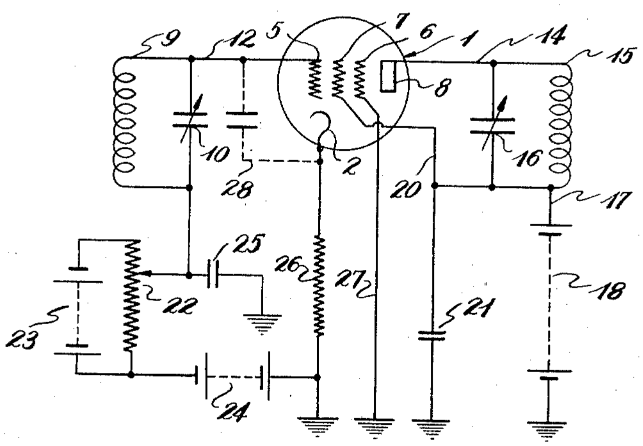
Fig. 1 is a schematic circuit diagram illustrating the electrical connections employed in one embodiment of my invention in which gain control is obtained by varying the direct bias potential applied to the grid.
Figure 2:
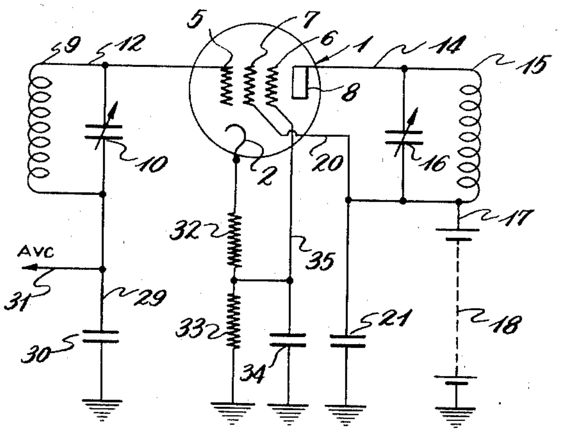
Fig. 2 is a circuit diagram similar to Fig. 1 but illustrating an alternative mode of neutralisation, and illustrating the variation in gain as being obtained from a variable potential automatic volume control circuit.
Figure 3:
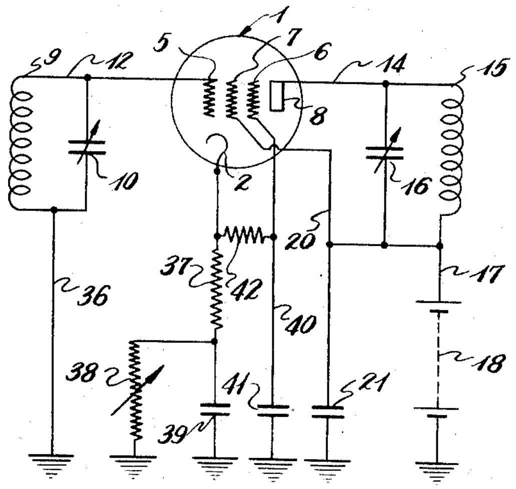
Fig. 3 is a diagram similar to Figs. 1 and 2, but illustrating the way in which neutralisation may be obtained when gain control is effected by varying the cathode resistance.

Referring to the drawings I have illustrated in each of Figs. 1, 2 and 3 a thermionic amplifier tube or vacuum tube 1, of conventional construction, and comprising a five element tube of the type popularly known as a "pentode." This tube includes a cathode or electron emitter arranged to be heated to an emitting temperature by a filament or heater (not shown) energised in a conventional manner as from a suitable source of electric power. The tubes also include a control grid 5, a suppressor grid 6, a screen grid 7 and an anode or plate 8.

The input circuits of the amplifiers may include coupling units such as input transformers including secondary windings 9, which may be tuned as by means of variable condensers 10 connected in parallel with the windings 9, the voltages to be amplified being induced in the secondary windings 9 by means of suitable primary windings (not shown). One terminal of the windings 9 is connected to the control grids 5 as by means of conductors 12.

The output circuits of the amplifiers may comprise conductors 14 extending from the plates 8 to output coupling devices such as transformers including primary windings 15. The windings 15 may be tuned as by means of variable condensers 16 connected in parallel with the windings 15. The other terminal of the windings 15 is connected as by means of conductors 17 to suitable sources of plate potential as, for example, batteries 18. The negative terminals of the batteries 18 are grounded as by conductors 19, and the batteries are preferably shunted by by-pass condensers 21.

The screen grids 7 are supplied with operating potential by means of conductors 20 extending between the screen grid 7 and the plate supply conductors 17.

The amplifier circuits thus far described are conventional, the principal novel feature of my invention residing in the neutralising circuits described in the following paragraphs.

Referring particularly to Fig. 1, the form of invention illustrated therein provides for gain control by means of a potentiometer 22 which is connected in parallel with a battery 23 which, in turn, is connected in series with a battery 24 having its positive terminal grounded. The movable arm position of the potentiometer 22 is connected to the low potential end of the winding 9 and is preferably by-passed to ground by means of a condenser 25. By this means the direct potential of the grid 5, with respect to ground, may be varied within limits to change the gain or amplification of the tube. The cathode 2 is connected to ground through an un-by-passed series resistance 26, while the suppressor grid 6 is connected directly to ground as by a conductor 27.

With the connections just described the cathode resistance 26 serves to neutralise the input capacity in the manner described in my aforementioned copending application, whereas the suppressor grid 6, by virtue of its direct connection to ground, shields the normal plate to cathode capacity and introduces a fixed and unchanging plate to ground capacity in the plate circuit. This will require a slightly different setting of the variable condenser 16 for resonance than would be required if the plate to suppressor grid capacity were absent. This change in setting is of no importance, whereas the fact that the capacity is constant and unchanging is a matter of extreme importance as it prevents phase shift in the output circuit.

To prevent the negative potential, as measured from the suppressor grid to the cathode, from exceeding the operating limits of the tube, the value of the resistance 26 may be held within the operating limits of the tube and additional neutralization obtained by an external grid to cathode condenser connected in the manner indicated by the circuit 28 in Fig. 1.

The circuit 28 may be omitted if the value of cathode resistance required for complete neutralization does not provide too large a suppressor grid to cathode bias.

In Fig. 2 I have illustrated a somewhat similar circuit in which the low potential end of the secondary winding 9 is returned to ground as regards radio frequency signals by means of a conductor 29 and a by-pass condenser 30. Gain control is obtained by connecting the conductor 29 to a suitable automatic volume control bus 31, as is represented by the arrow bearing the legend A. V. C. In Fig. 2 I have illustrated the cathode as being returned to ground through two series connected resistances 32 and 33, the grounded resistance 33 being by-passed by a condenser 34. In this form of the invention the suppressor grid 6 is connected as by a conductor 35 to a midpoint between resistances 32 and 33. This type of cathode and suppressor grid circuit places the suppressor grid at ground potential as regards the signals passed by the tube. It permits the direct current resistances of the cathode circuit to be made as high as required to obtain the desired operating bias, and at the same time limits the signal impedance of the cathode circuit to that which is required for proper input neutralisation.

In Fig. 3 I have illustrated a circuit arrangement which can be employed when the gain of the amplifier is to be changed by varying the cathode resistance. In this case the low potential end of the transformer winding 9 is connected directly to ground as by conductor 36. The cathode 2 is connected to ground through series connected resistances 37 and 38, the latter being connected to ground and being made variable so that the operating bias of the tube may be varied by varying the resistance 38. The resistance 38 is preferably by-passed as by a condenser 39.

The suppressor grid 6 is connected to ground as regards signal frequencies by the means of a conductor 40 and a condenser 41. A filter resistance 42 connected between the cathode and the suppressor grid serves to hold the suppressor grid at the same direct potential with respect to ground as that applied to the cathode. This serves to obviate the difficulty resulting from an excessive bias voltage between the cathode and the suppressor grid.

Attention is directed to the fact that in each of the circuits illustrated and described in the foregoing, the suppressor grid is returned directly to ground as regards signal frequencies. In the event the tubes employed are of the type including an internal plate or anode shield, this shield will be connected directly to the suppressor grid, and by this means returned to ground as regards signal frequencies.

Attention is directed particularly to the fact that the connection of the suppressor grid and/or the internal anode shield to ground serves to completely eliminate the phase shifting effects of the internal plate to cathode capacity of the tube, thus permitting the use of un-by-passed cathode resistances for neutralising the changing input capacity of the tube, and without requiring the use of complex and troublesome external plate neutralising circuits.

While I have shown and described the preferred embodiment of my invention I do not desire to be limited to the details of construction illustrated and described herein except as defined in the appended claim.

I claim:

In a single frequency alternating voltage amplifier, the combination of: a thermionic vacuum tube having a cathode, a first grid, a second grid, a plate, and a fifth element near said plate and disposed between said plate and said second grid; a tuned input circuit extending between said first grid and ground for applying an input signal of said single frequency to said first grid; a tuned output circuit extending from said plate to ground for developing between said plate and ground an output signal of said single frequency and corresponding to said input signal; a common circuit extending from said cathode to ground and common to said input and output circuits; means for applying to said second grid a signal-free direct positive potential; means for applying a variable direct bias potential between said cathode and said first grid to vary the gain of said tube; means for maintaining the reactive load on said input circuit constant with changes in said variable bias comprising a resistance in said common circuit having a value sufficient to produce a signal voltage ratio of the signal between said first grid and ground to the signal between said first grid and said cathode which is equal to the ratio of the hot and cold grid to cathode capacities of said tube; means for applying to said fifth element a direct potential which differs from ground potential by no more than the direct potential of said cathode; and means for preventing an effective change in the capacity of said output circuit with changes in said bias comprising an auxiliary circuit for maintaining said fifth element at zero signal level with reference to ground to thereby reduce the plate to cathode capacity to a negligible value.

WILLIAM J. O'BRIEN.

REFERENCES CITED

The following references are of record in the file of this patent:

UNITED STATES PATENTS

| Number | Name | Date |
|---|---|---|
| 2,000,433 | Barden | May 7, 1935 |
| 2,131,538 | McCarthy | Sept. 27, 1938 |
| 2,154,327 | Freeland | Apr. 11, 1939 |
| 2,200,062 | Groeneveld | May 7, 1940 |
| 2,237,420 | Ferris | Apr. 8, 1941 |
| 2,241,534 | Blumlein et al. | May 13, 1941 |
| 2,250,996 | Mayer | July 29, 1941 |
| 2,255,679 | Riddle, Jr. | Sept. 9, 1941 |
| 2,273,134 | Mountjoy | Feb. 17, 1942 |
| 2,314,958 | Van Der Ziel | Mar. 30, 1943 |
| 2,353,018 | Duke | July 4, 1944 |
| 2,404,809 | O'Brien | July 30, 1946 |
| 2,416,334 | Levy | Feb. 25, 1947 |
| 2,427,688 | Norgaard | Sept. 23, 1947 |